United States Patent [19]

Tanaka

[11] Patent Number: 4,744,243
[45] Date of Patent: May 17, 1988

[54] METHOD OF AND APPARATUS FOR DETECTING MAXIMUM CYLINDER PRESSURE ANGLE IN INTERNAL COMBUSTION ENGINE

[75] Inventor: Akira Tanaka, Wako, Japan

[73] Assignee: Honda Giken Kogyo Kabushiki Kaisha, Tokyo, Japan

[21] Appl. No.: 63,955

[22] Filed: Jun. 19, 1987

[30] Foreign Application Priority Data

Jun. 28, 1986 [JP] Japan ................................. 61-150654

[51] Int. Cl.$^4$ ........................................... G01M 15/00
[52] U.S. Cl. ..................................... 73/115; 73/117.3
[58] Field of Search ...................... 73/115, 117.3, 116; 123/425, 494

[56] References Cited

U.S. PATENT DOCUMENTS 4,601,196  7/1986  Frelund ................................. 73/115
4,672,843  6/1987  Pozniak ............................. 73/117.3

Primary Examiner—Jerry W. Myracle
Attorney, Agent, or Firm—Armstrong, Nikaido, Marmelstein & Kubovcik

[57] ABSTRACT

A method of and an apparatus for detecting maximum cylinder pressure angle in an internal combustion engine. A crankshaft angle sensor detects a piston reference position such as top dead center (TDC) and the maximum cylinder pressure angle is obtained by measuring the interval between the reference position and the position at which pressure in the cylinder becomes maximum. Non-firing of the engine is detected and the position at which the motoring pressure occurring during non-firing becomes maximum is deemed to be the actual top dead center. The actual top dead center is used for correcting the output of the crankshaft angle sensor, enabling accurate detection of the maximum pressure angle. As the output error of the crankshaft sensor is substantially linearly proportional to the engine speed, the output error can be approximated as its average value or as a value obtained by interpolation.

13 Claims, 6 Drawing Sheets

FIG. 3 (a) No knocking
FIG. 3 (b) Knocking
FIG. 3 (c) Sensor fail
FIG. 6

METHOD OF AND APPARATUS FOR DETECTING MAXIMUM CYLINDER PRESSURE ANGLE IN INTERNAL COMBUSTION ENGINE

BACKGROUND OF THE INVENTION

1. Field of the Invention

This invention relates to a method of and an apparatus for detecting the maximum cylinder pressure angle in an internal combustion engine, and more particularly to a method of and an apparatus for detecting the maximum cylinder pressure angle in an internal combustion engine which enables accurate detection of the maximum pressure angle by using the actual piston top dead center (TDC) position as the basis for correcting for error arising in detection of a reference crankshaft angular position required for determining the maximum cylinder pressure angle.

2. Description of the Prior Art

There are known methods or apparatuses for detecting the cylinder pressure of an internal combustion engine and then controlling engine operation, such as the ignition timing thereof on the basis of the angle at which the cylinder pressure becomes maximum. For example, Japanese Laid-open Patent Publication No. 56(1981)-101071 discloses an apparatus in which a reference crankshaft angle such as top dead center (TDC) is detected by use of a crankshaft angle sensor and the position at which the maximum cylinder pressure occurs (the maximum pressure angle $\theta$ pmax) is determined based on the reference crankshaft angle.

As the crankshaft angle sensor there is generally used an electromagnetic pickup or any other detecting element such as an electromagnetic resistive element, a Hall element or a photo-element. Particularly when an electromagnetic pickup is used, however, there arises a detection lag caused by inductance so that it is impossible to accurately detect the reference crankshaft angle. As a result, an error arises in the detection of the maximum pressure angle and engine operation such as an ignition timing cannot be controlled accurately. Moreover, irrespective of what kind of sensor is employed, detection error will arise if there is any error in the position at which the sensor is attached to the crankshaft or the like. It has also been difficult to avoid errors in sensor output resulting from inevitable variance among individual sensors.

One method that has been used for overcoming these problems has been to experimentally determine data required for compensation in advance and to store this data in a memory constituting a part of the control device for controlling the operation of the internal combustion engine. In this case too, however, it is necessary to accurately mount the crankshaft angle sensor at the prescribed position and, at any rate, it is still impossible to compensate for variance among individual sensors.

Figure 1:
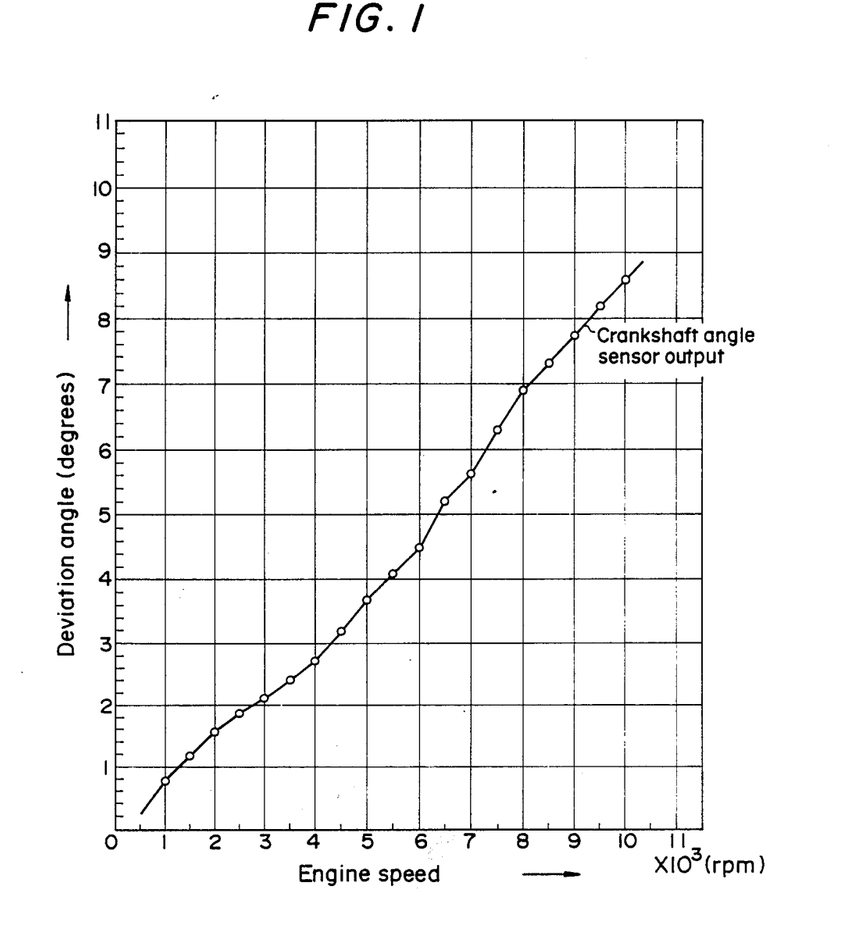
FIG. 1 is a graph based on data obtained through experiments conducted by the inventor regarding the detection lag (deviation angle) of a crankshaft angle sensor.

FIG. 1 shows data experimentally obtained by the inventor regarding the detection lag (deviation angle) of a crankshaft angle sensor. As will be noted from this graph, the angle of detection deviation increases with increasing engine speed and the amount of deviation increases substantially linearly with increasing speed. Apart from the above, it should also be noted that it is a well-known fact that during motoring (when there is no explosive combustion of air-fuel mixture, i.e. during non-firing) the cylinder pressure becomes maximum at piston TDC.

SUMMARY OF THE INVENTION

The object of the invention is to provide a method of and an apparatus for detecting maximum cylinder pressure angle in an internal combustion engine wherein the actual position of piston TDC is detected and a reference crankshaft angular position detected by a crankshaft angle detecting means is corrected on the basis of data on the actual TDC position, thereby enabling accurate detection of the maximum pressure angle.

For achieving this object, the invention provides, in one of its aspects, a method of detecting maximum cylinder pressure in an internal combustion engine comprising the steps of detecting reference crankshaft angular positions with respect to an engine piston, said reference crankshaft angular positions including the crankshaft angular position at piston TDC, determining the actual piston TDC position, correcting the detected reference crankshaft angular positions on the basis of the determined actual piston TDC position, and determining the maximum pressure angle by measuring the interval between the corrected reference crankshaft angular positions and the angular position at which maximum cylinder pressure occurs. Also for achieving the aforesaid object, the present invention provides, in another of its aspects, an apparatus for detecting maximum cylinder pressure angle in an internal combustion engine comprising a crankshaft angle detection means disposed in the proximity of a rotating member of the internal combustion engine and detecting reference crankshaft angular positions with respect to an engine piston, said reference crankshaft angular positions including the crankshaft angular position at piston TDC, a combustion state detection means disposed in the proximity of a combustion chamber of the internal combustion engine and detecting the state of combustion in the combustion chamber, an actual TDC position detection means for detecting the actual TDC of the engine piston, and a maximum pressure angle computation means for receiving as inputs the outputs from the actual TDC position detection means, the crankshaft angle detection means and the combustion state detection means, and correcting the value output by the crankshaft angle detection means on the basis of the output of the actual TDC position detection means, and on the basis of the corrected crankshaft angular position computing the maximum cylinder pressure angle from the output of the combustion state detection means.

The above and other features of the present invention will become apparent from the following description made with reference to the drawings.

BRIEF DESCRIPTION OF THE DRAWINGS

FIG. 3(a) to FIG. 3(c) are waveform diagrams relating to outputs of the apparatus shown in FIG. 2;

DESCRIPTION OF THE PREFERRED EMBODIMENTS

Figure 2:
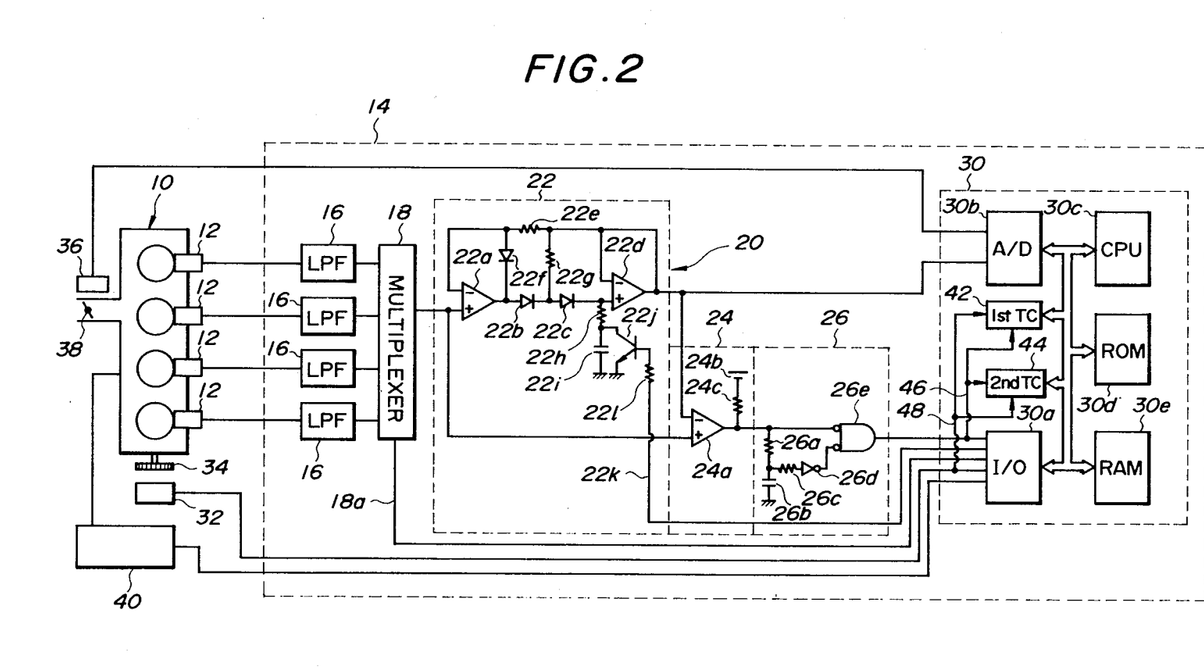
FIG. 2 is a block diagram of a detection apparatus according to the invention.

For ease of understanding, the detection apparatus according to the present invention will be described first. FIG. 2 shows an apparatus for detecting maximum cylinder pressure angle in an internal combustion engine constituted as a device for controlling ignition timing.

In FIG. 2, the reference numeral 10 denotes a four-cylinder internal combustion engine. Piezoelectric pressure sensors 12 are disposed one for each cylinder so as to face into the combustion chamber of the cylinder. The outputs of the pressure sensors are passed through charge-voltage converters or high impedance circuits (neither shown) and then forwarded to a control unit 14 in which they are applied to low pass filters 16. The cut-off frequency of the low pass filters 16 is set higher than knocking frequency so that high frequency components due to knocking can be detected. The stage following the low pass filters 16 is a multiplexer 18 which is controlled by the CPU of a microcomputer (to be described later) so as to forward the outputs from the filters 16 to the succeeding stage in the firing order of the cylinders.

Figure 3:
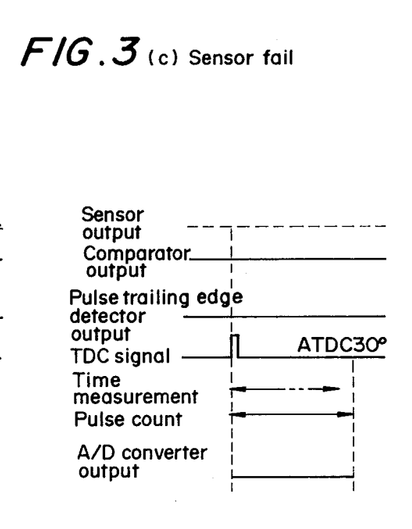

The next stage following the multiplexer 18 is a maximum cylinder pressure angle signal/knocking signal generator 20 which is constituted of a peak hold circuit 30, a comparator 24 and a pulse trailing edge detector 26. The output from the multiplexer 18 is first input to the peak hold circuit 22 which holds the peak output of the multiplexer 18 and produces an output as shown in FIG. 3(a). The circuit 22 includes a first operational amplifier 22a which receives the output of the multiplexer 18 on its non-inverting input terminal. The first operational amplifier 22a is connected through diodes 22b, 22c to the non-inverting input terminal of a second operational amplifier 22d connected with a voltage follower, and the output of the second operational amplifier 22d is fed back through a resistor 22e to the inverting terminal of the first operational amplifier 22a. The feedback circuit between the first and second operational amplifiers includes a diode 22f and a resistor 22g. The connection line between the diode 22c and the second operational amplifier 22d is connected to ground through a resistor 22h and a capacitor 22i and also to the collector terminal of a transistor 22j which is operated by the CPU through a reset signal line 22k and a resistor 22l.

The peak hold circuit 22 is followed by the comparator 24 which is constituted of a third operational amplifier 24a having a voltage source 24b conneted with its output terminal through a resistor 24c. The inverting terminal of the third operational amplifier 24a receives the output of the peak hold circuit 22 while the non-inverting terminal thereof is directly connected with the output terminal of the multiplexer 18. As a small difference arises in the inputs to the inverting and non-inverting terminals of the third operational amplifier 24a when the cylinder pressure maximizes, the comparator 24 outputs a pulse signal when the cylinder pressure peaks. (See FIG. 3(a).) As will also be noted from F 3(a), FIG. 3(b) and FIG. 3(c), the maximum cylinder pressure angle signal/knocking signal generator 20 is so arranged that when knocking does not occur it produces a single pulse at the time the maximum pressure value is reached (FIG. 3(a)) and in cases where knocking occurs and a high frequency wave component is superposed on the waveform, it produces signals not only at the said time but also at each time thereafter that the output of the pressure sensor (multiplexer) comes to exceed the peak hold output, so that a plurality of pulses are produced (FIG. 3(b)). As the knocking frequency is about 10 times higher than the cylinder pressure frequency, the charging constant determined by the resistor 22h and the capacitor 22i is set so as to slow the operating speed to a level below the knocking frequency, as shown in FIG. 3(b).

The stage following the comparator 24 is the pulse trailing edge detector 26. This detector 26 is constituted of a resistor 26a, a capacitor 26b, a resistor 26c, an invertor 26d and a NOR gate 26e, and functions to detect the trailing edge of the comparator output and outputs a pulse of predetermined width for use in facilitating processing operations to be described later. (See FIG. 3(a)). Therefore, by measuring the time lapse between a predetermined reference position such as TDC (top dead center) and the position at which the pulse is produced and converting the so-measured time Tpmax to an angular value, it is possible to calculate the maximum pressure angle $\theta$pmax. Moreover, by counting the number of pulses produced it can be determined whether or not knocking has occurred. Also, as shown in FIG. 3(c), if the pressure sensor 12 should fail to function, this can be detected from the fact that no pulse is produced within the time measurement period.

The stage following the pulse trailing edge detector 26 is a microcomputer 30 having an input/output (I/O) terminal board 30a to which the output from the circuit 26 is applied. In addition to the I/O terminal board 30a, the microcomputer 30 has an A/D converter 30b, a CPU 30c, a ROM (read-only memory) 30d and a RAM (random access memory) 30e. As shown in FIG. 2, the output terminal of the peak hold circuit 22 is also directly connected to the A/D converter 30b, in parallel with the aforesaid connection with the comparator 24. The A/D converter 30b digitally converts the output from the peak hold circuit 22 once per given time or angle interval. The largest data obtained by this conversion is the maximum cylinder pressure Pmax. (See FIG. 3(a)).

A crankshaft angle sensor 32 is disposed in the vicinity of a rotating member 34 of the internal combustion engine 10 to serve as a means for detecting the crankshaft angle. The sensor 34 produces a cylinder identification signal once per predetermined angle of rotation of the crankshaft, namely, every 720 degrees rotation of the crankshaft in a four-cylinder engine during which one cycle of power strokes are completed in the order of, for example, the first, third, fourth and second cylinders. It also produces TDC signals once every 180 degrees rotation of the crankshaft at the time the respective pistons reach TDC, and further at predetermined angle intervals produces prescribed unit angle signals as subdivisions of the TDC angle signal. Therefore, by counting the number of TDC signals following production of the cylinder identification signal, it is possible to discriminate which cylinder is at TDC at the time that TDC signal is produced. Further, the engine speed can be calculated from the unit angle signals. The output from the sensor 32 is first shaped in a wave-shaping circuit (not shown) and then input to the CPU 30c via the I/O terminal board 30a. For detecting the load condition of the internal combustion engine 10, the engine 10 is further equipped with a pressure sensor 36 disposed at an appropriate location between a throttle valve 38 and an intake manifold (not shown), which detects absolute pressure of air flowing at that location. The output of the pressure sensor 36 is sent to the A/D converter 30b of the microcomputer 30. The stage following the control unit 14 is an ignition unit 40 consisting of an igniter, a distributor and the like. The output of the ignition unit 40 is applied to an ignition plug (not shown) which ignites the fuel and air mixture in the engine combustion chamber. At an appropriate angle of rotation, the CPU 30c of the microcomputer 30 issues a command through the reset signal line 22k for resetting the peak hold circuit 22, and also issues a gate switch-over command to the multiplexer 18 through a signal line 18a.

The microcomputer 30 further has a first time counter 42 and a second time counter 44. In addition to being sent to the I/O terminal board 30a, the output from the pulse trailing edge detector 26 is also applied via a signal line 46 to the set terminal of the second time counter 44 and to the reset terminal of the first time counters 42. Further, the output of the crankshaft angle sensor 32 is sent not only to the I/O terminal board 30a but also via a signal line 48 to the set terminal of the first time counter 42 and to the reset terminal of the second time counter 44. The microcomputer 30 also has a clock and a pulse counter for counting the output pulses from the pulse trailing edge detector 26 (neither shown).

Figure 4:
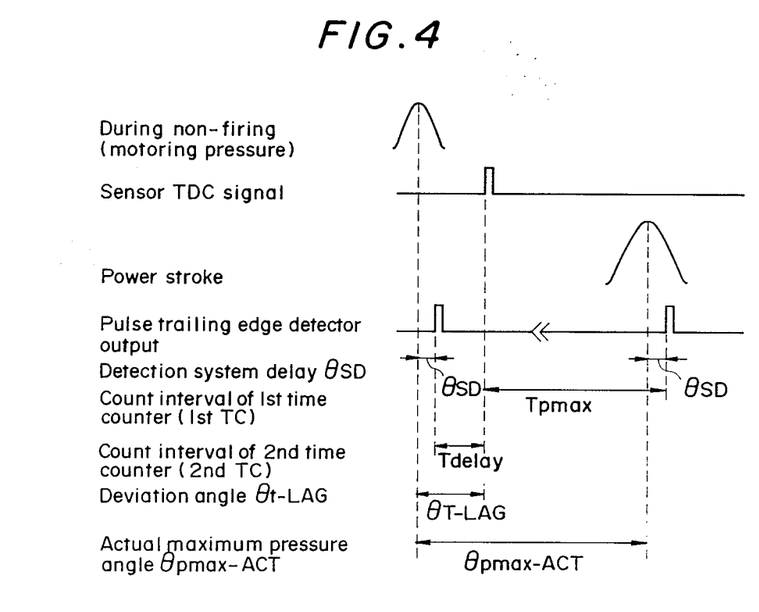
FIG. 4 is a timing chart for explaining the operation of the apparatus.

The timing chart of FIG. 4 shows the operations of the first and second time counters. The first time counter 42 begins to count clock pulses upon being set by a TDC signal from the crankshaft angle sensor 32 and ceases its count upon being reset by an output pulse from the pulse trailing edge detector 26, in this way measuring the time lapse Tpmax between the TDC position detected by the sensor 32 and the position at which the maximum cylinder pressure occurs during power stroke of the engine. The measured time value is sent to the CPU 30c which computes the maximum pressure angle $\theta$pmax by multiplying the count value Tpmax by a prescribed time-angle conversion factor k. The second time counter 44 begins to count clock pulses upon being set by an output pulse from the pulse trailing edge detector 26 and ceases its count upon being reset by a TDC signal from the crankshaft angle sensor 32, in this way measuring the time lapse Tdelay between the position at which the maximum cylinder pressure occurs during a non-firing stroke (defined herein to mean a stroke which would ordinarily be a power stroke but which in fact becomes a motoring stroke since no explosive combustion occurs) of the engine and the TDC position detected by the sensor 32. The measured time value is sent to the CPU 30c.

As mentioned before, it is well-known that the position at which the maximum motoring cylinder pressure occurs is the actual TDC of the engine piston. Therefore, by adding the lag $\theta$SD of the detection system including the pressure sensors 12 to the value obtained by multiplying the measured value of Tdelay by the time-angle conversion factor k, there can be obtained the deviation angle $\theta$T-LAG shown in FIG. 4. That is $$\theta T\text{-}LAG = k \times Tdelay + \theta SD \quad (1)$$

Therefore, the real value of the maximum pressure angle $\theta$pmax, i.e. $\theta$pmax-ACT becomes $$\theta pmax\text{-}ACT = k \times Tpmax + \theta T\text{-}LAG - \theta SD \quad (2)$$

As the detection lag $\theta$SD is negligible for one and the same cylinder, equations (1) and (2) can be rewritten as $$\theta T\text{-}LAG = k \times Tdelay \quad (1)'$$
$$\theta pmax\text{-}ACT = k \times Tpmax + \theta T\text{-}LAG \quad (2)'$$

As will be explained in more detail later, while the maximum pressure angle is in the vicinity of 10 degrees after top dead center (ATDC) in the case where combustion occurs (when there is a power stroke), when the engine is motoring because, for example, the fuel supply has been cut off, the maximum pressure angle arrives while the first time counter used in conjunction with detection is still at zero or at least at less than a prescribed value. Therefore, the CPU 30c is able to detect from the value of the first time counter that combustion has not occurred, as well as to determine the deviation angle $\theta$T-LAG from the count value of the second time counter and stores the determined deviation angle in the RAM 30e. In this case, the engine speed at this time is detected from the output of the crankshaft angle sensor 32 and stored in the RAM 30e in association with the deviation angle $\theta$T-LAG so that the deviation angle $\theta$T-LAG can later be retrieved as a function of the engine speed. One portion of the RAM 30e is backed up so that data $\theta$T-LAG stored therein will not be lost even after the engine is stopped and the microcomputer 30 ceases to operate.

Figure 5:
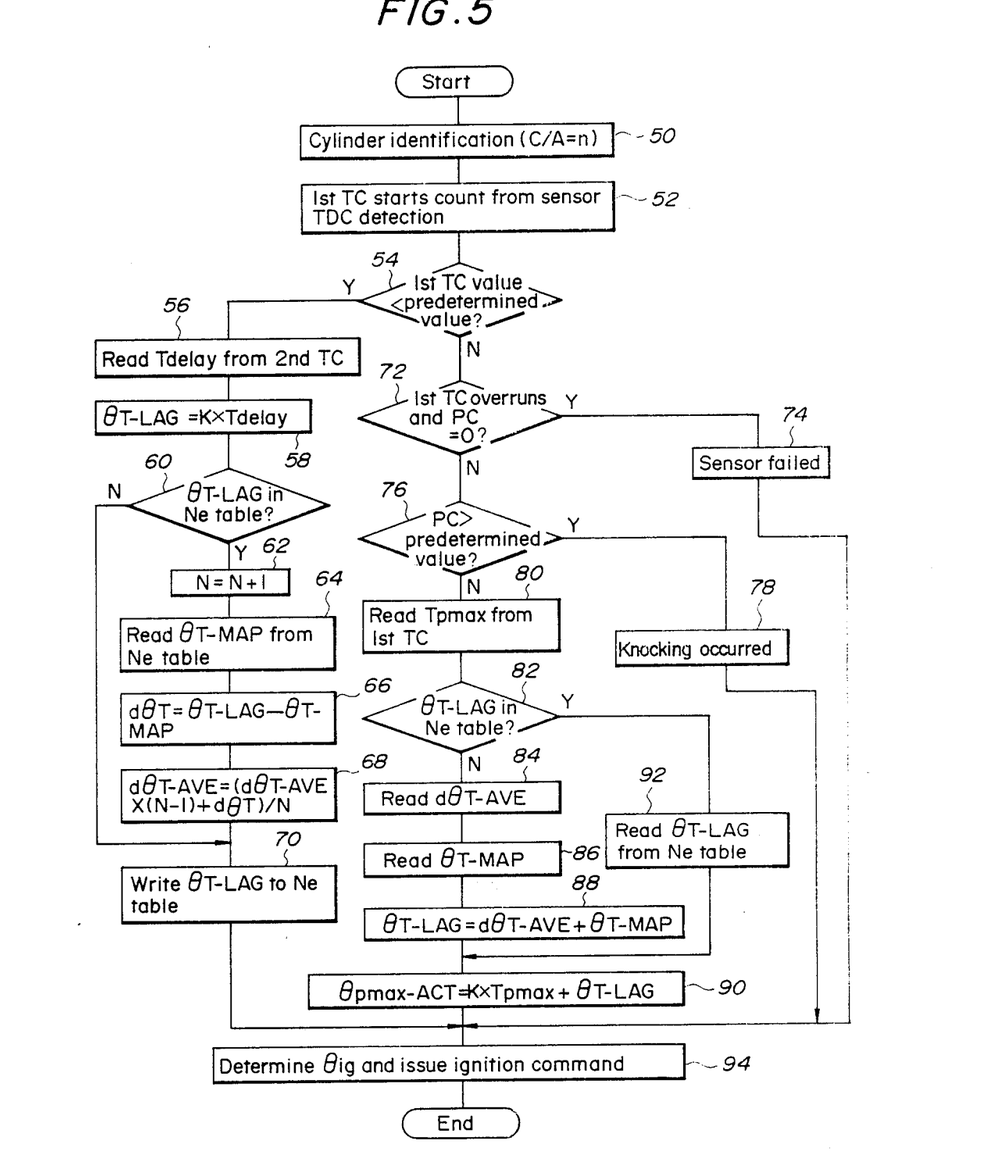
FIG. 5 is a flowchart showing mode of operation of the apparatus of FIG. 2 and an embodiment of the detection method according to the invention.

The mode of operation of the apparatus as well as embodiments of the detection method according to the invention will now be explained with reference to the flowchart of FIG. 5.

To begin with, in step 50, the cylinder is identified and then specified by assigning it the address C/A=n. The reason for identifying the cylinder in the step 50 is to enable ignition timing control to be carried out independently for each cylinder. Then in step 52, the first time counter is started by a TDC signal from the associated pressure sensor 12.

In the following step 54, it is determined whether or not the count of the first time counter has reached a predetermined value. When a power stroke occurs, the count of the first time counter should be a value corresponding to a crankshaft angle in the vicinity of 10 degrees ATDC. Therefore, by appropriately setting the aforesaid predetermined value, it becomes possible to detect whether or not a power stroke has occurred.

When it is determined in the step 54 that a non-firing stroke has occurred, the count of the second time counter, namely the value Tdelay, is read in step 56. In this case, it is presumed that the second time counter was started from the position at which the maximum motoring pressure occurred. Next in step 58, the deviation angle $\theta$T-LAG is calculated by multiplying the count value Tdelay by the time-angle conversion factor k. It should be noted that while FIG. 4 shows the deviation angle $\theta$T-LAG to include the delay $\theta$SD of the sensor system, as noted earlier this delay can be ignored where the cylinder is the same. The time-angle conversion factor k is calculated as $$k = rpm \times 360 \text{ degrees}/60 \text{ sec}$$

Next in step 60, an Ne table stored in the backed-up (non-volatile) portion of the RAM 30e is checked to find whether or not it includes a deviation angle $\theta$T-LAG corresponding to the current engine speed Ne. It is presumed that the engine speed Ne was computed from the output of the crankshaft angle sensor 32 at appropriate steps (not shown). Since as shown in FIG. 1 the deviation angle $\theta$T-LAG varies depending on the engine speed Ne, it is necessary to determine whether there has been stored the value of the deviation angle $\theta$T-LAG corresponding to the engine speed Ne detected by use of the crankshaft angle sensor 32. The deviation angle $\theta$T-LAG is stored to memory during each non-firing stroke of the piston.

Figure 6:
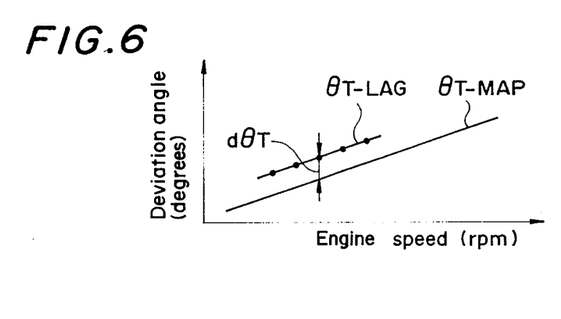
FIG. 6 is a graph for explaining the method of computation according the invention.

In step 60, when it is determined that there is corresponding data, the deviation from the reference deviation angle is computed prior to updating the stored value. More specifically, in step 62 the number of non-firing strokes N is counted for use in later calculating the average value of deviation from the reference deviation angles, while at the same time in step 64 the reference deviation angle $\theta$T-MAP is retrieved using the current engine speed Ne. In other words, since it cannot be presumed that non-firing strokes will occur over the full range of engine speeds, this embodiment of the invention provides for reference deviation angles $\theta$T-MAP to be determined experimentally in advance as shown in FIG. 6, whereafter by determining the deviation d$\theta$t between the reference value $\theta$T-MAP and the actual deviation $\theta$T-LAG in the manner to be described later, it becomes possible, even in the case where no deviation angle $\theta$T-LAG has been stored in memory for a given engine speed Ne, to obtain an approximation thereof by adding the deviation d$\theta$T to the reference deviation angle $\theta$T-MAP. More particularly, since as shown in FIG. 6, the deviation d$\theta$T can be presumed to remain substantially constant irrespective of variation in the engine speed Ne, the approximated values of the deviation angle $\theta$T-LAG can be effectively employed for correcting the crankshaft sensor output over the entire range of engine speeds.

Therefore, the deviation d$\theta$T is obtained in step 66 by subtracting the reference deviation angle $\theta$T-MAP from the measured value $\theta$T-LAG, and in step 68 the average d$\theta$T-AVE of deviation d$\theta$T is calculated for all values including those already stored to memory, and the so-obtained d$\theta$T-AVE is stored in the memory area for the cylinder concerned. As stated in the foregoing, the deviation d$\theta$T is intended only as a substitute value for use in the case where no deviation angle $\theta$T-LAG has been stored in memory for the engine speed concerned and since it can be presumed to be a substantially constant value over the full range of engine speeds, it need not be written to memory in association with the engine speed Ne but need only be stored separately for each cylinder.

Next in step 70, the deviation angle $\theta$T-LAG obtained in the step 58 is stored in the portion of the RAM 30 containing the Ne table for the cylinder concerned. In this case, if a corresponding value has already been stored, this is updated and if, as in the case where the decision in the step 60 is NO, the value obtained at this time is newly written to memory.

When it is found in the step 54 that the count value of the first time counter is equal to or greater than the prescribed value and thus that combustion has occurred, it is determined in step 72 whether or not the first time counter has overflowed and its pulse count value become zero. If the determination in the step 72 is YES, this indicates sensor failure as indicated in FIG. 3(c) (step 74). If the determination is NO, the operation moves to step 76 where it is determined whether or not the pulse count value is equal to or greater than the prescribed value. If it is, it is decided in step 78 that knocking has occurred. If it is not, since this indicates normal combustion, the operation moves to step 80 where the count value Tpmax of the first time counter is read. Then in step 82 a check is made to learn whether a deviation angle $\theta$T-LAG has been stored for the current engine speed. If one has not been stored, the average value of deviation d$\theta$T-AVE is read, the reference deviation angle $\theta$T-MAP for the current speed is retrieved, and the said two values are added to obtain an approximate deviation angle $\theta$T-LAG (steps 84, 86, 88). Next in step 90, the aforesaid count value Tpmax is converted to an angular value and the deviation angle $\theta$T-LAG is added to the converted value to obtain the actual maximum pressure angle $\theta$pmax-ACT. Where a deviation angle $\theta$T-ACT corresponding to the speed concerned is already contained in memory, this is read out and used for calculating the actual maximum pressure angle $\theta$pmax-ACT (steps 82, 92, 90). In the final step 94, the ignition timing $\theta$ig is determined and an ignition command is issued. In the case where it is found in step 74 that the sensor has failed, the state of engine operation is detected by the pressure sensor 36 etc. and determination of ignition timing is carried out in an alternative mode.

Figure 7:
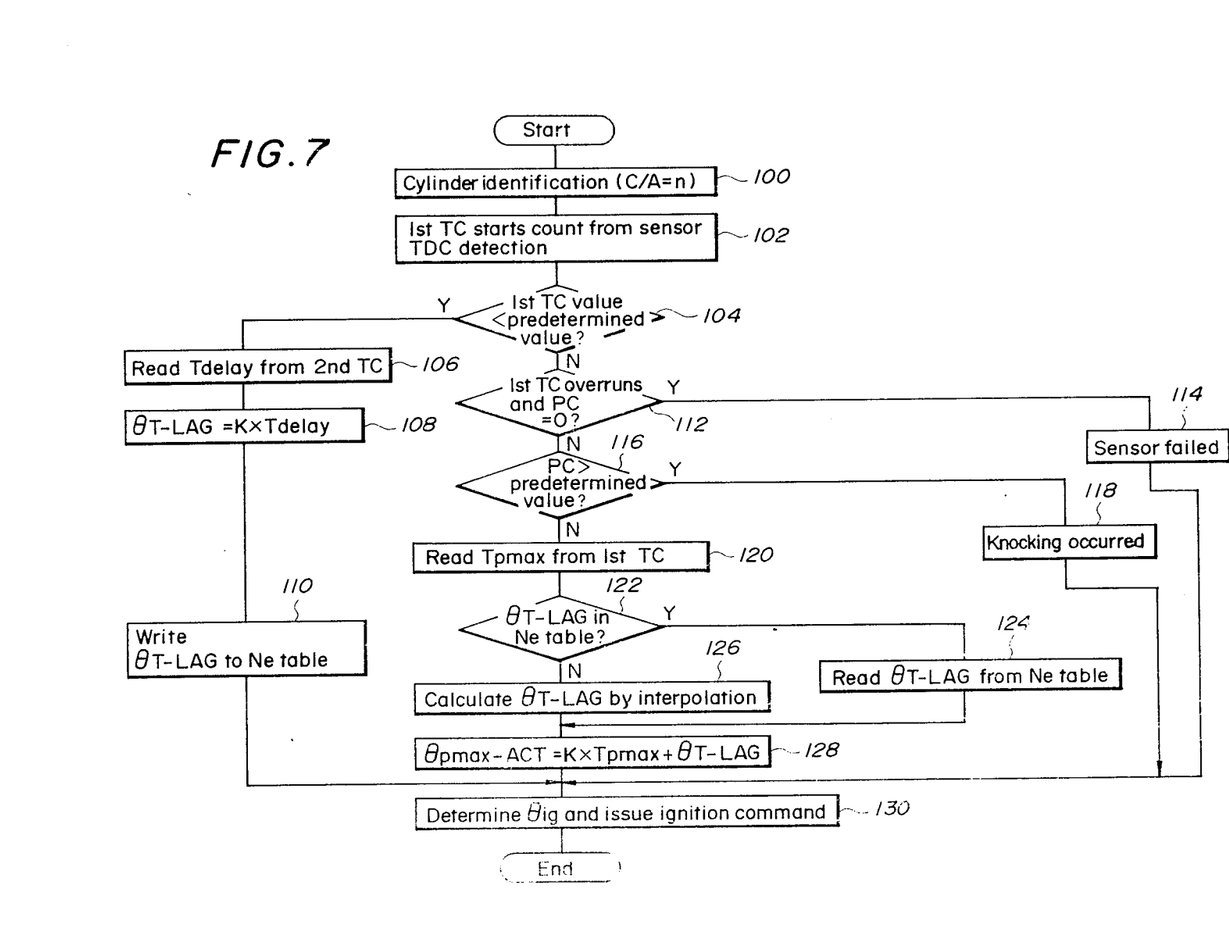
FIG. 7 is a flowchart showing a second embodiment of the detection method according to the invention.

A second embodiment of the detection method according to the present invention is shown by the flowchart in FIG. 7. In explaining this embodiment, only the points of difference from the first embodiment will be discussed.

Each time non-firing is detected, a deviation angle $\theta$T-ACT is stored in memory for the engine speed concerned (steps 100–110). When normal combustion is detected but no deviation angle is found to be stored in memory for the engine speed concerned (steps 104–122), an approximate deviation angle is calculated from the nearest available deviation angles by interpolation, whereafter the actual maximum pressure angle is calculated and the ignition timing determined (steps 126, 128, 130). This method of calculation is feasible since, as shown in FIG. 1, the relationship between the deviation angle $\theta$T-LAG and the engine speed is substantially linear so that even if no value has been recorded in memory for the speed concerned, it is still possible to obtain an approximate value by interpolation. The advantage of this embodiment over the first embodiment is that the number of processing steps can be reduced.

While in the aforesaid embodiments the deviation angles are calculated separately for each cylinder, it is alternately possible to designate one representative cylinder and to carry out correction for all of the cylinders using the deviation angle found for the representative cylinder. It should be noted, however, that in such case it of course becomes impossible to ignore the aforesaid delay $\theta$SD of the detection system. Further, while in the aforesaid embodiments non-firing is detected from the count of the first time counter, it is alternately possible to carry out this detection by obtaining the maximum cylinder pressure Pmax from the A/D converted output of the peak hold circuit 22 and comparing this Pmax with a prescribed reference value. Moreover, while in the aforesaid embodiments a time value is first measured and then multiplied by a conversion factor to obtain an angular value, it is alternately possible to arrange for the crankshaft angle sensor 32 to output a signal once for every degree of crankshaft rotation and to carry out the calculation from the start using angular values.

Since the present invention enables accurate correction of the reference crankshaft angular position detected by the crankshaft angle sensor, it is able to compensate for errors introduced as the result of both manufacturing variance among individual sensors and variance in sensor mounting position.

The present invention has thus been shown and described with reference to specific embodiments. However, it should be noted that the present invention is in no way limited to the details of the described arrangements but changes and modifications may be made without departing from the scope of the appended claims.

What is claimed is:

1. A method of detecting maximum cylinder pressure angle in an internal combustion engine, comprising the steps of:
   a. detecting at least one reference crankshaft angular position with respect to an engine piston, said reference crankshaft angular position including the crankshaft angular position at piston top dead center
   b. determining the actual piston top dead center position,
   c. correcting the detected reference crankshaft angular position on the basis of the determined actual piston top dead center position, and
   d. determining the maximum pressure angle by measuring the interval between the corrected reference crankshaft angular position and the angular position at which maximum cylinder pressure occurs.

2. The method according to claim 1 wherein the actual piston top dead center position is determined from motoring pressure during non-firing.

3. The method according to claim 2 wherein the value for correcting the reference crankshaft angle is obtained as a deviation from a reference error value.

4. The method according to claim 3 wherein the reference error value increases and decreases in proportion as the engine speed increases and decreases.

5. An apparatus for detecting maximum cylinder pressure angle in an internal combustion engine, comprising:
   a. a crankshaft angle detection means disposed in the proximity of a rotating member of an internal combustion engine and detecting reference crankshaft angular positions with respect to at least one engine piston, said reference crankshaft angular positions including the crankshaft angular position at piston top dead center,
   b. a combustion state detection means disposed in the proximity of a combustion chamber of the internal combustion engine and detecting the state of combustion in the combustion chamber,
   c. an actual top dead center position detection means for detecting the actual top dead center of the engine piston, and
   d. a maximum pressure angle computation means for receiving as inputs the outputs from the actual top dead center position detection means, the crankshaft angle detection means and the combustion state detection means, and correcting the value output by the crankshaft angle detection means on the basis of the output of the actual top dead center position detection means, and on the basis of the corrected crankshaft angular position computing the maximum cylinder pressure angle from the output of the combustion state detection means.

6. An apparatus according to claim 5 wherein the actual top dead center position detection means detects the actual top dead center from motoring pressure during engine non-firing.

7. An apparatus according to claim 6 further including an error computation means for computing error between the output of the crankshaft angle detection means and the actual top dead center position detection means, the error computation means computing detection error as a deviation from a predetermined reference error value.

8. An apparatus according to claim 7 wherein the reference error value increases and decreases in proportion as the engine speed increases and decreases.

9. An apparatus for detecting maximum cylinder pressure angle in an internal combustion engine, comprising:
   a. a crankshaft angle detection means disposed in the proximity of a rotating member of an internal combustion engine and detecting reference crankshaft angular positions with respect to at least one engine piston, said reference crankshaft angular positions including the crankshaft angular position at piston top dead center,
   b. a combustion state detection means disposed in the proximity of a combustion chamber of the internal combustion engine and detecting the state of combustion in the combustion chamber,
   c. a maximum pressure position detection means receiving as input the output of the combustion state detection means and determining the maximum pressure position represented by said output,
   d. an actual top dead center position detection means receiving as inputs the outputs of the maximum pressure position detection means and the crankshaft angle detection means and determining the actual dead center position of the engine piston,
   e. an error computation means receiving as inputs the outputs of the actual top dead center position detection means and the crankshaft angle detection means and computing from these inputs any error in the output of the crankshaft angle detection means, and
   f. a maximum pressure angle computation means which receives as inputs the outputs of the error computation means, the crankshaft angle detection means and the maximum pressure position detection means, uses the value output by the error computation means to correct the value output by the crankshaft angle detection means, and computes the crankshaft angle at which the pressure becomes maximum from the maximum pressure position using the corrected crankshaft angle value.

10. An apparatus according to claim 9 wherein the actual top dead center position detection means detects non-firing of the engine from the output of the maximum pressure position detection means and determines the actual top dead center position from motoring pressure during engine non-firing.

11. An apparatus according to claim 10 wherein the error computation means computes said error as a deviation from a reference error value.

12. An apparatus according to claim 11 wherein the reference error value increases and decreases in proportion as the engine speed increases and decreases.

13. An apparatus according to claim 10 wherein the error and the maximum pressure angle are once computed as time values and then converted into angular values.

* * * * *